United States Patent
Braun et al.

(10) Patent No.: US 9,784,360 B2
(45) Date of Patent: Oct. 10, 2017

(54) DRIVE DEVICE FOR THE MOTORIZED ACTUATION OF A FUNCTIONAL ELEMENT OF A MOTOR VEHICLE

(71) Applicant: Dr. Ing. h.c. F. Porsche Aktiengesellschaft, Stuttgart (DE)

(72) Inventors: Wolfgang Braun, Albershausen (DE); Thomas Huebener, Berlin (DE)

(73) Assignee: DR. ING. H.C.F. Porsche AKTIENGESELLSCHAFT, Stuttgart (DE)

(*) Notice: Subject to any disclaimer, the term of this patent is extended or adjusted under 35 U.S.C. 154(b) by 362 days.

(21) Appl. No.: 14/637,528

(22) Filed: Mar. 4, 2015

(65) Prior Publication Data

US 2015/0260272 A1    Sep. 17, 2015

(30) Foreign Application Priority Data

Mar. 11, 2014    (DE) .......................... 10 2014 103 216

(51) Int. Cl.
| | | |
|---|---|---|
| *F16H 57/021* | (2012.01) | |
| *F16C 27/06* | (2006.01) | |
| *F16H 57/12* | (2006.01) | |
| *B60J 7/057* | (2006.01) | |

(52) U.S. Cl.
CPC .......... *F16H 57/021* (2013.01); *F16C 27/06* (2013.01); *F16C 27/063* (2013.01); *F16H 57/12* (2013.01); *B60J 7/0573* (2013.01); *F16H 2057/0213* (2013.01); *F16H 2057/126* (2013.01); *Y10T 74/19623* (2015.01)

(58) Field of Classification Search
CPC ........ F16H 57/021; F16H 57/12; F16C 27/06; F16C 27/063
See application file for complete search history.

(56) References Cited

U.S. PATENT DOCUMENTS

| | | | | |
|---|---|---|---|---|
| 3,583,253 A | * | 6/1971 | Grimshaw | ................ F16H 1/16 192/150 |
| 5,212,999 A | * | 5/1993 | Kitada | ...................... B60S 1/08 384/223 |
| 5,287,770 A | * | 2/1994 | Mudd | ....................... F16H 1/16 74/425 |
| 6,486,577 B1 | | 11/2002 | Ursel et al. | |

(Continued)

FOREIGN PATENT DOCUMENTS

| | | |
|---|---|---|
| DE | 911 196 | 5/1954 |
| DE | 42 10 302 | 11/1994 |

(Continued)

*Primary Examiner* — David M Fenstermacher
(74) *Attorney, Agent, or Firm* — Gerald E. Hespos; Michael J. Porco; Matthew T. Hespos (57) ABSTRACT

A drive device (1) for motorized actuation of a functional element of a motor vehicle has an electric motor (2) with a motor shaft (3) and also has a worm shaft (4) of a worm gearing. A first end of the worm shaft is connected to the motor shaft (3) and a second end is received in a radial bearing (5). The radial bearing (5) has a bearing body (21) with an outer surface mounted in a housing (11) and at least one annular bearing element (24) is mounted to the worm shaft (4). The bearing element (24) is elastic at least in a partial region to ensure compensation for tolerances in the region of the radial bearing.

17 Claims, 5 Drawing Sheets

(56) References Cited

U.S. PATENT DOCUMENTS

2006/0053920 A1\* 3/2006 Kawamura ....... B60R 25/02153
  74/425
2006/0243078 A1\* 11/2006 Sesita ..................... F16C 25/08
  74/425
2006/0254376 A1\* 11/2006 Ota .......................... F16H 1/16
  74/425

FOREIGN PATENT DOCUMENTS

| DE | 297 02 525 | 7/1998 |
| DE | 298 15 858 | 1/1999 |
| DE | 10 2010 053 278 | 6/2012 |
| EP | 1 334 296 | 5/2005 |

\* cited by examiner

DRIVE DEVICE FOR THE MOTORIZED ACTUATION OF A FUNCTIONAL ELEMENT OF A MOTOR VEHICLE

CROSS REFERENCE TO RELATED APPLICATION

This application claims priority under 35 USC 119 to German Patent Appl. No. 10 2014 103 216.0 filed on Mar. 11, 2014, the entire disclosure of which is incorporated herein by reference.

BACKGROUND

1. Field of the Invention

The invention relates to a drive device for the motorized actuation of a functional element of a motor vehicle, in particular for opening and closing a top of a convertible. The drive device has an electric motor with a motor shaft. A worm shaft of a worm gearing has one end connected to the motor shaft. A radial bearing receives the other end of the worm shaft.

2. Description of the Related Art

Drive devices of this type are used in vehicle manufacturing as servo motors for a very wide variety of purposes, for example for opening and closing a top of a convertible, for seat adjustments, steering column adjustments, window openers, sliding roofs or the like. A drive device of this type has a worm gearing connected downstream of the electric motor and advantageously has small dimensions. The worm gearing is self-locking, and large forces can be transmitted via the worm gearing.

The electric motor in a drive device of this type has a motor shaft mounted twice in the radial direction and axial direction of an electric motor housing. The worm shaft is connected to the motor shaft. Thus, an additional radial mounting of the worm shaft is required with defined compensation for tolerances in the region of the radial bearing.

DE 10 2010 053 278 A1 discloses such a drive device used, for example, in conjunction with a top of a convertible. The electric motor is designed as a brushless direct-current motor. An end of a spindle that faces away from the brushless direct-current motor is mounted in a radial bearing that can absorb reaction forces of the driven system. A radial bearing also may be at the other end of the spindle.

DE 297 02 525 U1, EP 1 334 296 B1 and DE 42 10 302 C2 show a drive device with an electric motor and a worm shaft that is drivable by said drive device and with means for compensating for a length tolerance of the worm shaft.

DE 298 15 858 U1 describes a plastics plain bearing for mounting a shaft in a bearing body and in a plastics housing receiving the bearing body. The bearing body is fixable axially by inwardly protruding projections.

DE 911 196 pushes tolerance compensating rings onto plain bearing bushes to compensate for manufacturing tolerances in the radial direction.

It is the object of the invention to develop a drive device of the type described above that can compensate for tolerances in the region of the radial bearing.

SUMMARY OF THE INVENTION

The invention relates to a drive device with a radial bearing that has a bearing body for mounting in a housing and at least one annular bearing element mounted in the worm shaft. The bearing element is at least partly elastic.

This elastic partial element ensures that a slight relative movement of worm shaft and radial bearing is possible during operation of the drive device. Furthermore, the elastic bearing element ensures that the worm shaft is supported radially only in a soft manner. The at least one annular bearing element mounted in the worm shaft can be mounted indirectly or directly in the worm shaft. The bearing element can be elastic in a partial region or can be completely elastic depending on the selection and configuration of the respectively used bearing element.

The electric motor may be a brushless direct-current motor. Furthermore, the worm shaft may be connected to the motor shaft by a press connection.

The bearing body may have at least one encircling groove provided radially on the inside for receiving a bearing element designed as an elastic ring. The bearing element is supported radially on the inside on a bearing bush that is mounted in the worm shaft. Such a design of the drive device is particularly simple structurally and the intended effect according to the invention can be realized in a particularly simple manner. For this purpose, the bearing body has to be provided with the encircling groove and the bearing element in the form of the elastic ring has to be assigned to the groove.

The inside of the bearing body may have at least one encircling groove radially for receiving a bearing element designed as an O-ring. The O-ring is supported radially on the inside on the bearing bush. Compensation for tolerances in the radial direction therefore is ensured in a simple manner by the interaction of the at least one O-ring and the contact surface of the bearing body. The contact surface is matched to the O-ring. In particular, the inside of the bearing body has two parallel encircling grooves. Each groove receives an O-ring that is supported on the bearing bush. The plural O-rings ensure that bearing forces are transmitted with a soft, radial support.

The inside of the bearing body may have an encircling groove for receiving a bearing ring. Outside of the ring may have encircling elevations and depressions so that the ring contacts the bearing body in the region of the elevations. Therefore, a bearing element with a profiling on the side facing the bearing body is used instead of an O-ring. Hence, the bearing element does not contact the bearing body in the region of the entire radially outer surface, but rather only in the region of the elevations. The bearing element yields in the region of the elevations when radial forces are introduced and thus ensures the optionally required, slight radial compensation for tolerances. Thus, the bearing element may elastically only in the partial region that has the elevations and depressions. An elastic design of the bearing ring is not absolutely required in other regions.

The groove assigned to the bearing element may be bounded axially by two ribs irrespective of the design of the respective bearing element, and the bearing element may be arranged between the ribs and bears radially on the outside against the base of the groove. The bearing element need not be positioned to bear axially against the bearing body. However, axial bearing may exist, such as when the bearing element is an O-ring that bears against the ribs bounding the respective groove.

A radial shifting of the worm shaft with respect to the radial bearing may be limited by a distance x between bearing body and bearing bush or a distance x between bearing body and at least one axial extension of the bearing element mounted directly in the worm shaft. This design ensures that forces from the worm wheel do not cause excessive bending or deflection of the worm shaft. The pliability of the bearing is limited by this maximally spanable distance x. Thus, at a distance between bearing body and bearing bush or bearing body and the at least one axial extension of the bearing element mounted directly in the worm shaft of 0 mm. The pliability of the bearing preferably is 0.1 mm.

The radially outer side of the bearing body may have radially protruding ribs, at least in a partial region. Thus, the tolerance-compensating reception of the bearing is achieved by the above-described annular bearing element between bearing body and worm shaft and by the radially protruding ribs at least at part of the radially outer region of the bearing body. The ribs result in a slight clamping of the radial bearing in the housing. The ribs are dimensioned so that a sufficient compressibility of the ribs is ensured upon arrangement in the housing.

The drive device may be designed so that the electric motor is mounted in a housing part via an adapter plate for the electric motor. The adapter plate may be insertable into the housing part, and the radial bearing that receives the worm shaft may be inserted in the housing part to achieve simple installation of the drive device.

The bearing body may have radially protruding ribs in a front region in the insertion direction of the radial bearing and/or in one or more lateral regions in the insertion direction. The base in the region of the bearing body that runs in front in the insertion direction of the radial bearing may have ribs that are thicker since the bearing force is transmitted into the housing. Laterally, the ribs enter the housing slightly, in particular in each case 0.1 mm to position the radial bearing in a clamping manner. The ribs preferably become wider with respect to the base up to 1 mm. On the base, the ribs no longer enter the housing in the unloaded case to ensure concentricity of the radial bearing with respect to the worm shaft. The bearing body would have an offset if no ribs were provided, and therefore would have a play of 0.3 mm, with respect to the housing surface. This play is not present with the ribs. The bearing body preferably is made of a material having a Shore hardness of approximately 70. This corresponds approximately to the hardness of the annular bearing element, in particular to the hardness of the O-ring.

The annular bearing element may be a unitary rubber element.

The bearing body also can have bores in the region of the solid material for weight reduction and flexibility. The material yields to a different extent depending on the bore distance and bore diameter.

Further features of the invention emerge from the attached drawing and the description of the preferred exemplary embodiments that are reproduced in the drawing.

DETAILED DESCRIPTION OF THE PREFERRED EMBODIMENTS

Figure 1:
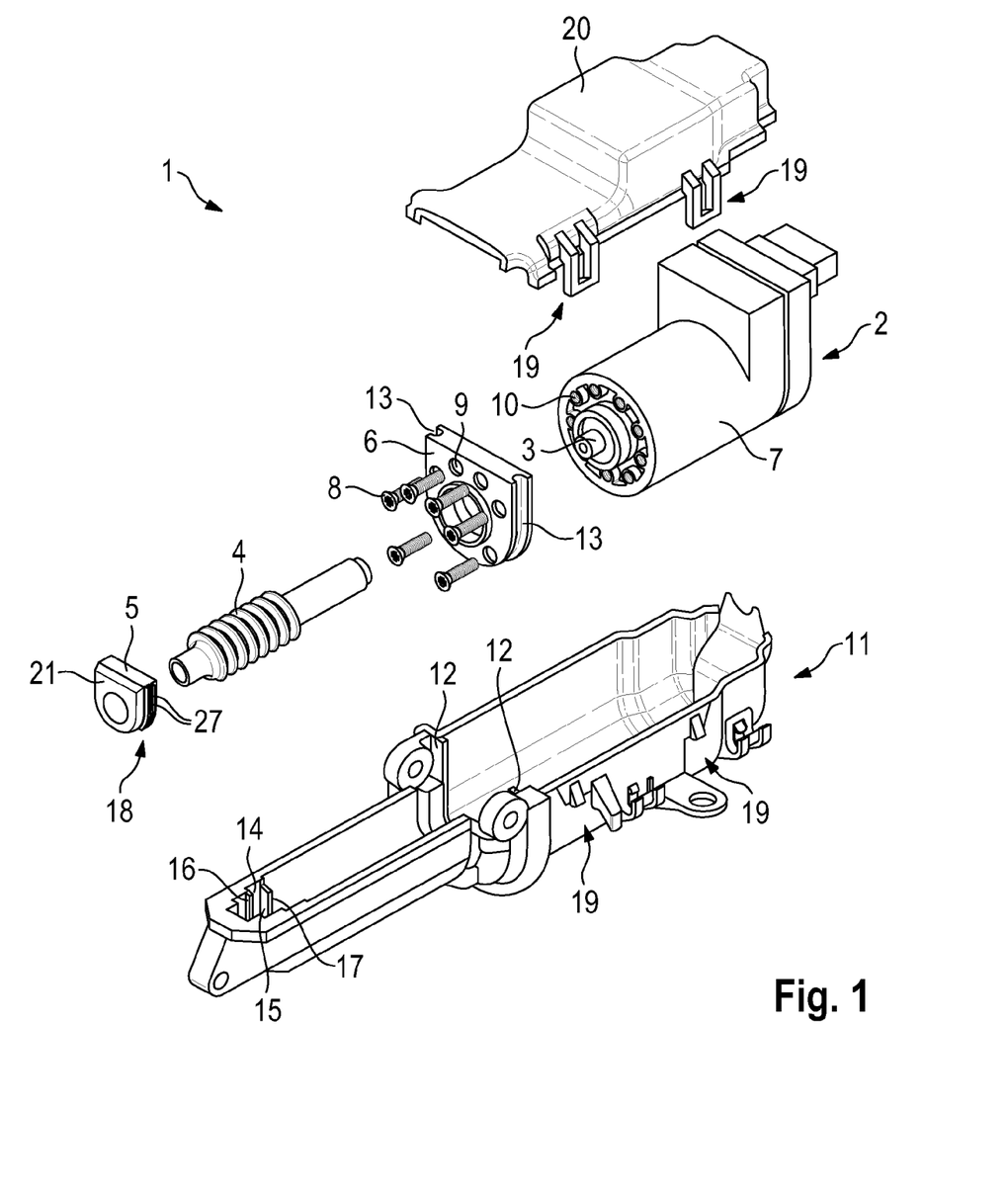
FIG. 1 is in an exploded perspective view of an exemplary embodiment of the drive device according to the invention.

FIG. 1 shows a drive device 1 for the motorized actuation of a functional element of a motor vehicle. The functional element may be used for opening and closing a top of a convertible.

The drive device 1 has an electric motor 2 with a motor shaft 3. The electric motor 2 is a brushless direct-current motor (BLDG motor). The drive device 1 also has a worm shaft 4 of a worm gearing (otherwise not illustrated further). One end of the worm shaft 4 is connected to the motor shaft 3 by a press connection and a radial bearing 5 receives the end of the worm shaft 4 facing away from the motor shaft 3. An adapter plate 6 is connected to the housing 7 in a region where the motor shaft 3 emerges from a housing 7 of the electric motor 2. This connection takes place by screws 8 that pass through holes 9 in the adapter plate 6 and are screwed into threaded bores 10 in the housing 7 of the electric motor 2.

The unit consisting of electric motor 2, adapter plate 6, worm shaft 4 and radial bearing 5 is inserted into a housing 11 of the drive device 1. For this purpose, the inside of the housing 11 has a U-shaped projecting web 12 that engages in a groove 13 of the adapter plate 6 when the adapter plate 6 is inserted into the housing 11. The housing 11 also has a U-shaped groove 14 formed by the inner wall surface 15 and two parallel U-shaped projections 16, 17 that bound the inner wall surface 15. The radial bearing 5 is received in the U-shaped groove 14. An outer contour 18 of the radial bearing 5 corresponds to the groove 14. A cover 20 is clipped to the housing 11 by clip connections 19 after the unit consisting of electric motor 2, adapter plate 6, worm shaft 4 and radial bearing 5 is inserted into the housing 11.

The stationary mounting of the drive device 1 is not shown.

Figure 2:
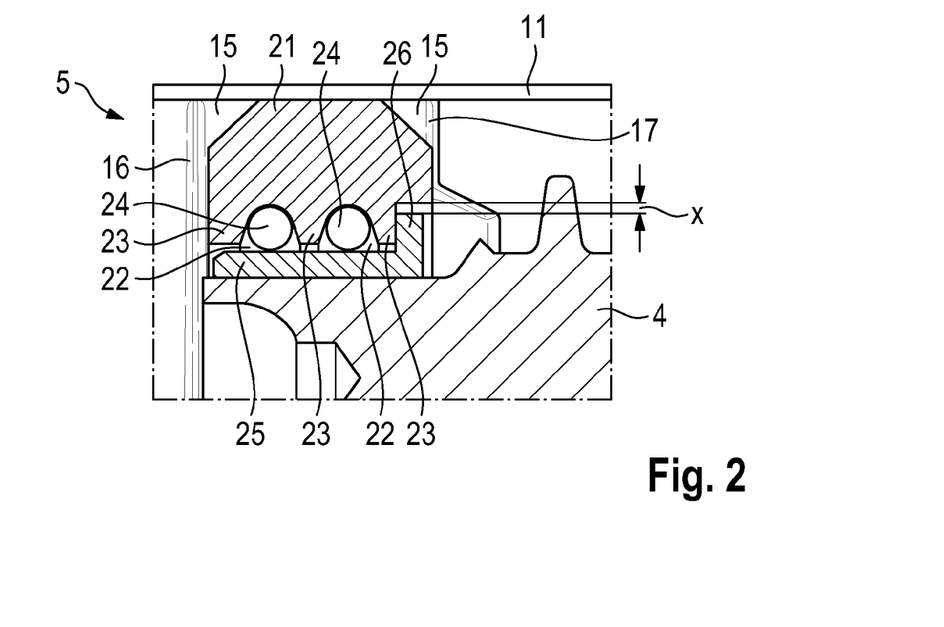
FIG. 2 is a sectional illustration of a partial region of the drive device for an exemplary embodiment of the radial bearing.

FIG. 2 shows an embodiment of the drive device 1 in a region where the radial bearing 5 is mounted in the housing 11 and where the worm shaft 4 is mounted in the radial bearing 5. The radial bearing 5 has a bearing body 21 for the radially outer mounting of the radial bearing 5 in the housing 11. The radially inner side of the bearing body 21 has two parallel encircling grooves 22. Each groove 22 has a U-shaped cross section and is bounded laterally by two ribs 23. Each groove 22 receives an elastic annular bearing element 24, which, in this embodiment, is an O-ring. The bearing elements 24 are supported radially on the inside on a bearing bush 25 of the radial bearing 5. The bearing bush 25 is plugged or pressed onto the worm shaft 4.

The electric motor 2 is mounted in the radial and axial direction. The worm shaft 4 is pressed onto the motor shaft 3, but needs an additional radial mounting that takes place by the radial bearing 5. To avoid over-determination of the mounting, the worm shaft 4 is supported only softly radially by the elastic bearing elements 24 of the radial bearing 5. Spring deflection travel x of the worm shaft 4 with respect to the bearing body 21 is limited to prevent forces applied by the worm wheel of the worm gearing from causing excessive bending or deflection of the worm shaft 4 and to avoid damage to the worm shaft 4 and the electric motor 2. More particularly, the bush 25 has a radially extending annular extension 26, that contacts the bearing body 21 at a spring deflection travel x of e. g. 0.1 mm, so that no further spring deflection can take place.

Figure 3:
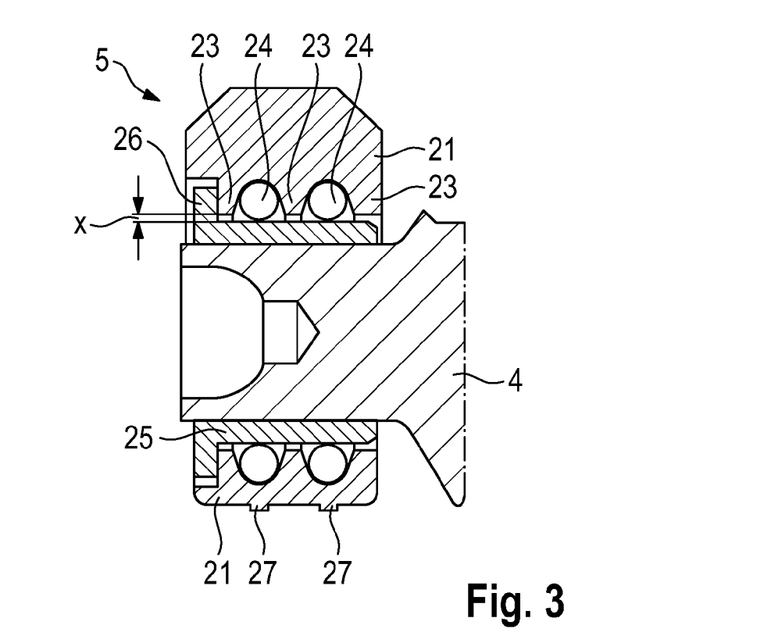
FIG. 3 is a sectional illustration of a partial region of the drive device for a further exemplary embodiment of the radial bearing.

The embodiment of FIG. 3 differs from that of FIG. 2 in that the bearing body 21 has ribs 27 provided along the radially outer surface of the U-shaped contour of the bearing body 21. The ribs 27 run along a U and are parallel to each other. The ribs 27 are of identical design and produce a slight lateral clamping of the bearing body 21 and therefore of the radial bearing 5 in the region of the wall surface 15 of the housing 11. The ribs 27 are thicker at the base where the bearing force is transmitted into the housing 11. Laterally, and, Each rib 27 enters laterally 9 (in the y direction), for example, 0.1 mm, into the housing 11 to position the radial bearing 5 in a clamping manner. The width of the ribs is, for example, 0.5 mm. The ribs 27 become wider, up to 1 mm, toward the base. At the base, the ribs no longer enter into the housing so as to ensure the concentricity of the radial bearing 5 with respect to the worm shaft 4 in the unloaded situation. The ribs 27 on the radius of the radial bearing 5 do not enter the housing 11 to ensure specific positioning in the housing 11. Without the ribs 27, the bearing body 21 has an offset of 0.3 mm with respect to the housing surface. This ensures a sufficient possibility of compressing the ribs 27. The Shore hardness of the bearing body 21, and therefore of the ribs 27, is approximately 70, which corresponds to the hardness of the bearing elements 24.

Figure 4:
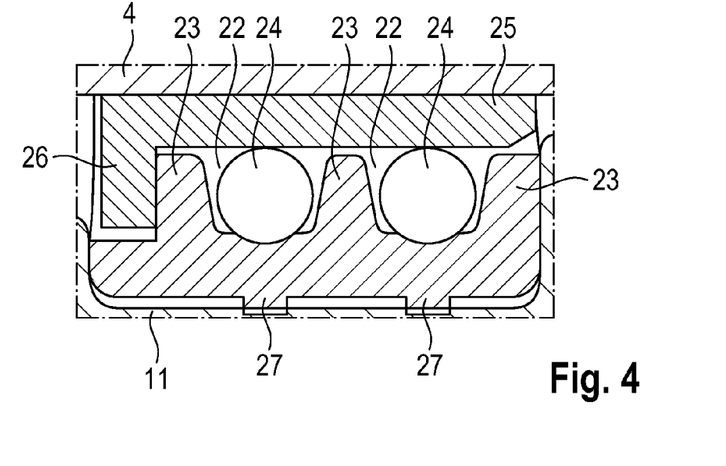
FIG. 4 is an enlarged illustration of the partial region of the radial bearing according to FIG. 3, shown in interaction with a housing of the drive device.

FIG. 4 shows the embodiment of FIG. 3 for a partial region of the bearing body 21 with the ribs 23, and the interaction with the housing 11.

Figure 5:
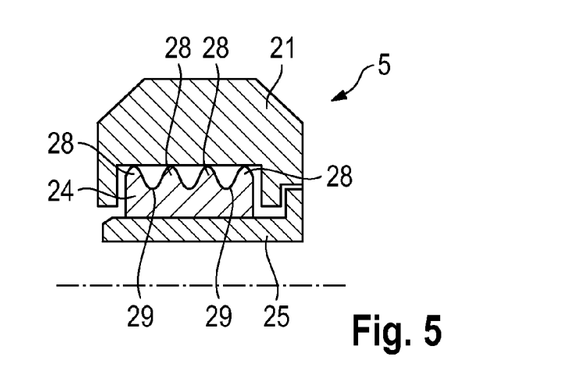
FIG. 5 is a sectional illustration of a further exemplary embodiment of the radial bearing.

The embodiment of FIG. 5 shows a bearing element 24 that is modified in relation to that of FIGS. 2 to 4. In this embodiment, the radially inner surface of the bearing body 21 has a single encircling groove of substantially rectangular cross-section for receiving a single ring-shaped bearing element 24. However, the outer circumferential surface of the bearing element 24 has circumferentially extending elevations 28 and depressions 29 that are parallel to one another. The bearing element 24 contacts the bearing body 21 in the region of the elevations 28. The bearing element 24 can be elastic in its entirety or only in a partial region, for example the region that has the elevations since the elevations cause the radial pliability of the radial bearing 5.

Figure 6:
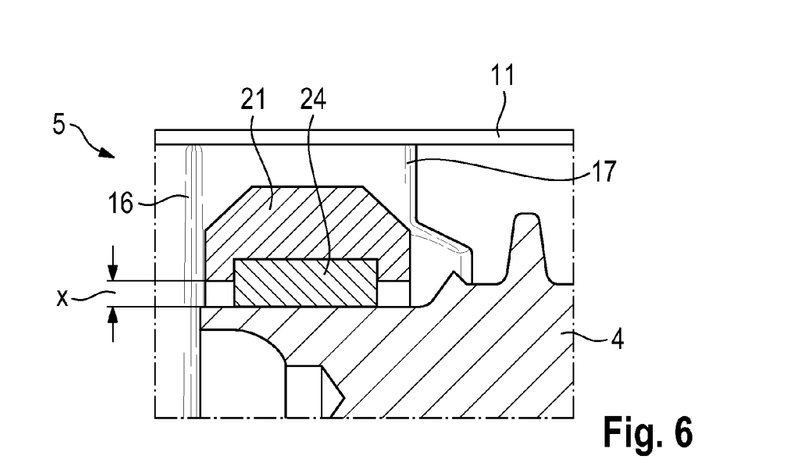
FIG. 6 is a sectional illustration of a further exemplary embodiment of the radial bearing shown in interaction with a worm shaft of a worm gearing.

The embodiment of FIG. 6 differs from FIGS. 2 to 5 in that the radial bearing 5 does not have a separate bearing bush 25. Instead of mounting the bearing element 24 indirectly in the worm shaft 4 via the bearing bush 25, as in the previous embodiments, the bearing element 24 is mounted directly in the worm shaft 4 in the embodiment of FIG. 6. The bearing element 24 may be similar to the embodiment of FIG. 5, but may not have the elevations 28 and depressions 29 so that the cross section of the bearing element 24 of FIG. 6 is rectangular. In the embodiment of FIG. 6, the bending of the worm shaft in the radial direction is limited by the distance x between bearing body 21 and worm shaft 4.

Figure 7:
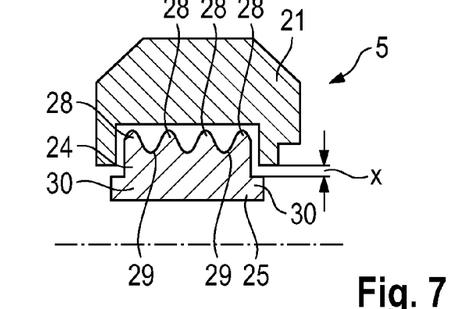
FIG. 7 is a sectional illustration of a further exemplary embodiment of the radial bearing.

The embodiment of FIG. 7 also has no bearing bush 25. However, the bearing element 24 has the elevations 28 and depressions 29, and also has axially extending extensions 30 in the radially inner region so that the distance size x for limiting bending of the worm shaft in the radial direction is produced by the distance between the bearing body 21 and the extensions 30 of the bearing element 24.

In the embodiment of FIG. 2, the radial compensation for tolerances takes place by the two bearing elements 24 in the form of the O-rings. In the embodiment of FIGS. 3 and 4, the compensation for tolerances takes place by the bearing elements 24 by the O-rings and by the ribs 27. In the embodiment of FIGS. 2 to 4, the bearing bush 25 is pressed in and is secured on account of the friction of the O-rings or action of a damping grease in conjunction with a rib. In this connection, installation takes place by inserting the bearing bush 25 into the bearing body 21, with the tension being applied to the O-rings. By contrast, the embodiment of FIG. 6 has no bearing bush 25, and manufacturing takes place by injection molding the bearing element 24, which has the function of the bearing bush, being inserted into the bearing body 21 and then the bearing element 24 being insert molded on the sides facing away from each other.

Figure 8:
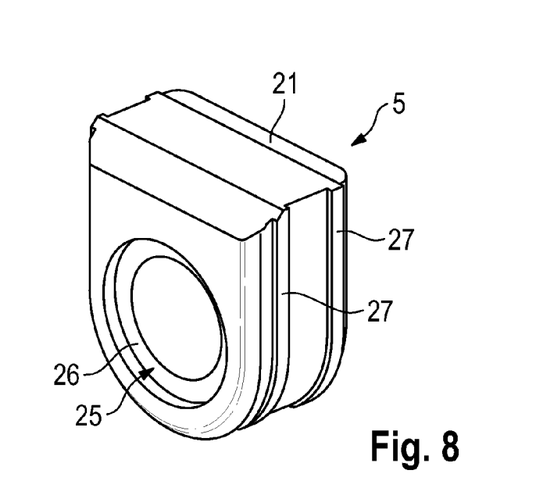
FIG. 8 is a perspective view of a further embodiment used in the drive device.

FIG. 8 shows an embodiment of a radial bearing 5 in an overall illustration with the ribs 23 on the outer side of the bearing body 21 for the purpose of compensating for tolerances with respect to the housing 11.

Figure 9:
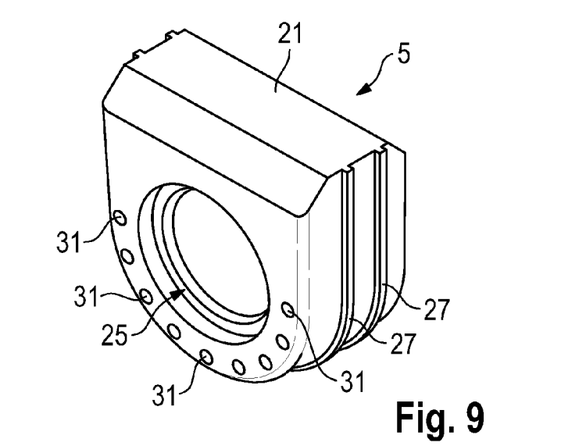
FIG. 9 is a perspective view of a further embodiment of the radial bearing.

The embodiment of FIG. 9 differs from FIG. 8 in that the ribs 27 are closer together and in that bores 31 are provided in the bearing body 21 to increase flexibility and reduce weight of the radial bearing 5. The bearing body 21 yields to a differing extent depending on the bore distance and bore diameter.

Figure 10:
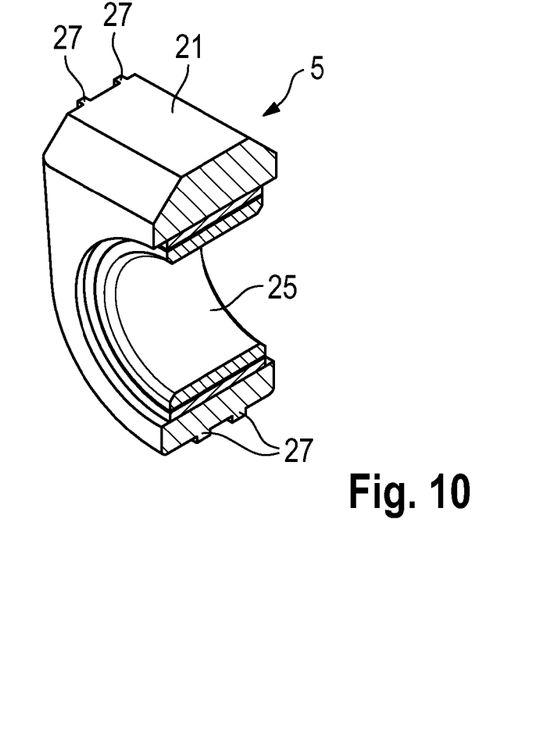
FIG. 10 is a perspective view of a further exemplary embodiment of the radial bearing shown for half of the radial bearing.

The embodiment of FIG. 10 shows the variant with the bearing bush 25 that is made from metal and is insert molded. The ribs 27 also are shown for this embodiment.

Figure 11:
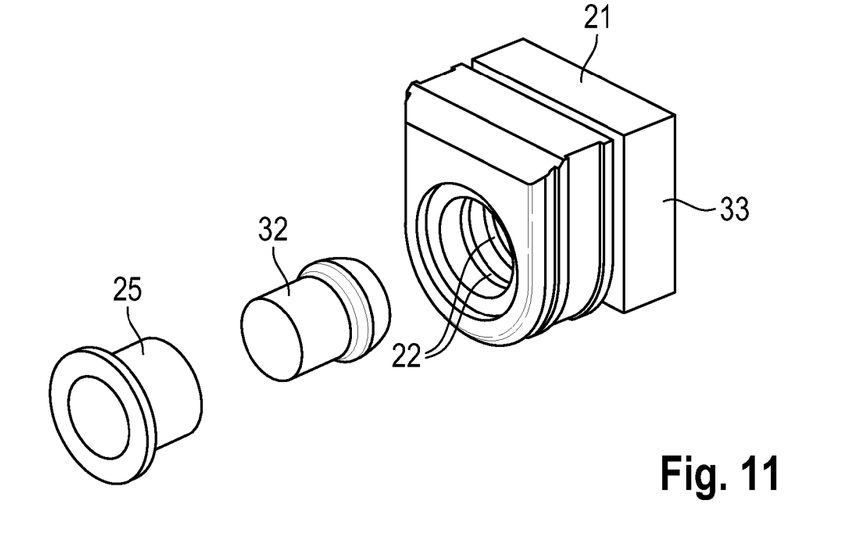
FIG. 11 is an exploded illustration, the preassembly of the bearing.

FIG. 11 clarifies the preassembly of the bearing, relating to the embodiment of FIG. 2. First, the O-rings, as the bearing elements 24, are inserted into the grooves 22 in the bearing body 21. The bearing bush 25 then is plugged onto a mandrel 32 and the bearing body 21 is placed on a counterholder 33. Mandrel 32 and bearing bush 25 are greased and inserted into the bearing body 21. The O-rings expand a little. The mandrel 32 is passed through, with the bearing bush 25 remaining in the bearing body 21.

LIST OF DESIGNATIONS 1 drive device
2 electric motor
3 motor shaft
4 worm shaft
5 radial bearing
6 adapter plate
7 housing
8 screw
9 hole
10 threaded bore
11 housing
12 web
13 groove
14 groove
15 wall surface
16 projection
17 projection
18 outer contour
19 clip connection
20 cover
21 bearing body 22 groove
23 rib
24 bearing element
25 bearing bush
26 annular extension
27 rib
28 elevation
29 depression
30 extension
31 bore
32 mandrel
33 counter holder

What is claimed is:

1. A drive device for motorized actuation of a functional element of a motor vehicle, comprising: an electric motor having a motor shaft, a worm shaft of a worm gearing having a first end connected to the motor shaft and a second end received in a radial bearing, the radial bearing having: a bearing body with an outer surface mounted in a housing and with a single inner circumferential groove; a bearing bush mounted to the worm shaft; and an annular bearing element defining a ring mounted on the bearing bush, the bearing element being elastic and being mounted in the inner circumferential groove of the bearing body, the bearing element having outer circumferential elevations and depressions and contacting the bearing body in regions of the elevations.

2. The drive device of claim 1, wherein the electric motor is a brushless direct-current motor.

3. The drive device of claim 1, wherein the worm shaft is connected to the motor shaft by a press connection.

4. The drive device of claim 1, wherein a radial shifting of the worm shaft with respect to the radial bearing is limited by a distance between the bearing body and the bearing bush.

5. The drive device of claim 1, wherein the bearing body has radially protruding ribs radially on an outer side.

6. The drive device of claim 1, wherein the electric motor is mounted in the housing via an adapter plate for the electric motor, the adapter plate being insertable into the housing, and the radial bearing that receives the worm shaft is mounted in the housing.

7. The drive device of claim 6, wherein the bearing body has radially protruding ribs in a region thereof running in front in the insertion direction of the radial bearing and/or in one or more lateral regions in the insertion direction.

8. The drive device of claim 1, wherein the bearing body has bores for reducing weight and increasing flexibility.

9. A drive device for motorized actuation of a functional element of a motor vehicle, comprising: an electric motor having a motor shaft, a worm shaft of a worm gearing having a first end connected to the motor shaft and a second end received in a radial bearing, the radial bearing having: a bearing body with an outer surface mounted in a housing and with at least one inner circumferential groove, the respective groove being bounded axially by two ribs; a bearing bush mounted on the worm shaft; and at least one annular bearing element mounted on the bearing bush, the bearing element being elastic and being arranged in the at least one inner circumferential groove between the ribs and bearing radially on an outer side against a base of the groove.

10. The drive device of claim 9, wherein the bearing body has radially protruding ribs radially on an outer side.

11. The drive device of claim 9, wherein the electric motor is mounted in the housing via an adapter plate for the electric motor, the adapter plate being insertable into the housing, and the radial bearing that receives the worm shaft is mounted in the housing.

12. The drive device of claim 11, wherein the bearing body has radially protruding ribs in one or more lateral regions in an insertion direction into the housing.

13. The drive device of claim 9, wherein the bearing body has bores for reducing weight and increasing flexibility.

14. The drive device of claim 9, wherein a radial shifting of the worm shaft with respect to the radial bearing is limited by a distance between the bearing body and the bearing bush.

15. The drive device of claim 9, wherein the bearing element is an O-ring supported radially on an inside on the bearing bush.

16. The drive device of claim 9, wherein the bearing body has two inner circumferential grooves arranged parallel to each other, each of the respective grooves having an O-ring as the bearing element supported on the bearing bush.

17. The drive device of claim 9, wherein a radial shifting of the worm shaft with respect to the radial bearing is limited by a distance between the bearing body and at least one axial extension of the bearing element mounted directly to the worm shaft.

* * * * *